United States Patent [19]

Hoehn

[11] 3,949,847
[45] Apr. 13, 1976

[54] LOCK-UP CLUTCH FLOW-LIMITING AND PRESSURE-REDUCING VALVE

[75] Inventor: Richard F. Hoehn, Pekin, Ill.
[73] Assignee: Caterpillar Tractor Co., Peoria, Ill.
[22] Filed: Nov. 7, 1974
[21] Appl. No.: 521,625

[52] U.S. Cl. ............... 192/3.3; 192/3.26; 192/3.57; 192/87.13; 192/109 F; 137/625.6
[51] Int. Cl.² .................. B60K 29/00; F16D 39/00
[58] Field of Search ....... 192/3.3, 3.57, 3.26, 87.13, 192/109 F

[56] References Cited
UNITED STATES PATENTS

| 2,707,887 | 5/1955 | Slack | 192/3.3 X |
| 3,326,066 | 6/1967 | Murphy | 192/3.33 X |
| 3,352,392 | 11/1967 | Black et al. | 192/109 F |
| 3,682,043 | 8/1972 | Bailey et al. | 192/3.57 |
| 3,820,417 | 6/1974 | Allen et al. | 192/109 F |

Primary Examiner—Benjamin W. Wyche
Attorney, Agent, or Firm—Phillips, Moore, Weissenberger Lempio & Strabala

[57] ABSTRACT

A power shift transmission having a torque converter with a lock-up clutch for locking the impeller to the turbine of the torque converter to provide direct drive from the engine to the input end of the transmission includes a flow-limiting pressure-reducing valve, between the source of pressurized fluid for actuating the clutches of the system, for reducing the pressure and flow of the fluid to the pressure-actuated lock-up clutch below the pressure for the actuation of the remainder of the clutches in the system. This system provides a smoother operation of the lock-up clutch as well as prevents the creation of a high pressure drop within the actuating fluid system.

3 Claims, 3 Drawing Figures

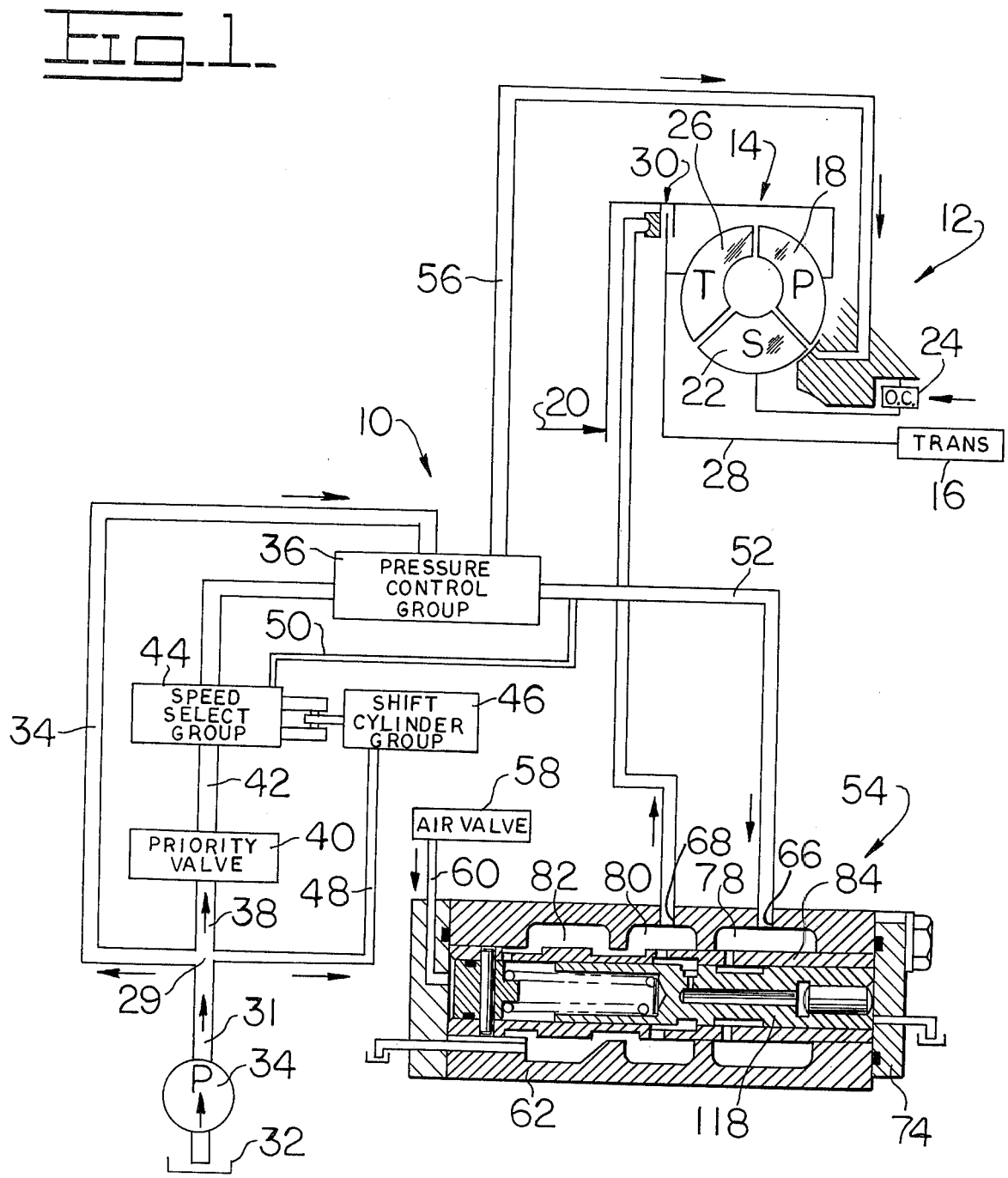

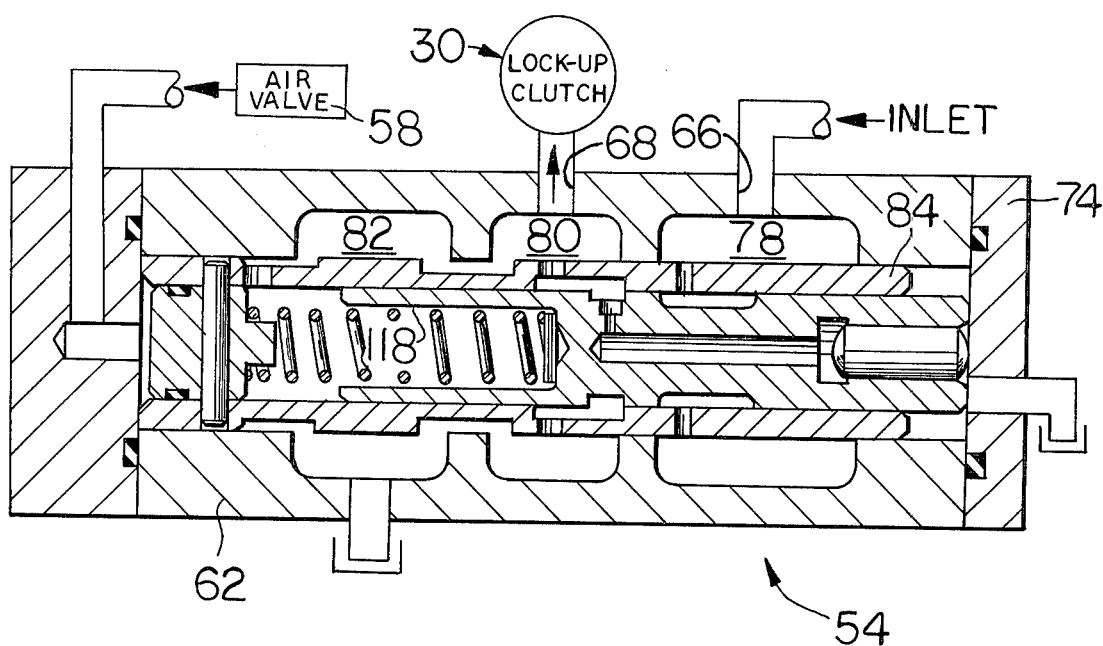
Fig_2
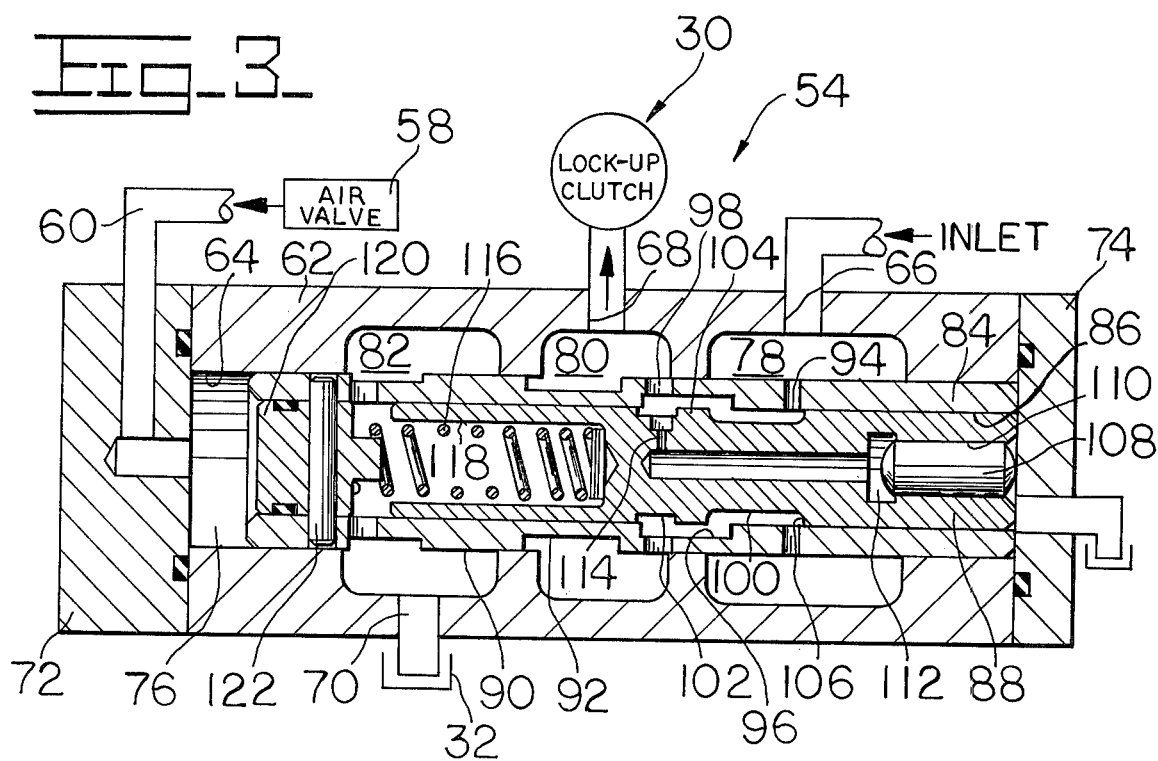
Fig_3

LOCK-UP CLUTCH FLOW-LIMITING AND PRESSURE-REDUCING VALVE

BACKGROUND OF THE INVENTION

The present invention relates to power shift transmission and pertains particularly to control means for power shift transmission having a torque converter with a lock-up clutch.

Power shift transmissions having a torque converter in combination with a multi-speed transmission or gear train are frequently used in large vehicles, including off-the-road earth-moving type vehicles. In such transmissions it is very often desirable to provide a direct drive from the engine of the vehicle to the input end of the transmission. This direct drive is often provided by means of a lock-up clutch which is operative to lock the turbine and impeller of the torque converter. This lock-up clutch is provided to be controlled simultaneously with and dependent upon fluid pressure used in the system for the engagement of transmission clutches.

One of the drawbacks of such a system is that fluid pressure for operating clutches on the transmission is often considerably higher than that required for operation of the lock-up clutch. The flow of fluid available from the pressure system is also normally in excess of that which is desirable for operation of a lock-up clutch. This high pressure and high flow rate quite often results in lack of precise control of the engagement of the lock-up clutch.

This high pressure and flow also results in a rapid drop in the system pressure when a valve is open to direct fluid to the lock-up clutch. This quite frequently results in such a drop in pressure that other clutches in the transmission are allowed to slip, resulting in a lack of positive drive through the transmission.

One approach to this problem has been to provide means for controlling the rate of increase of fluid pressure within the lock-up clutch. While this approach may solve the problem of the grabbing of the lock-up clutch, it does not solve the problem of the rapid drop in fluid pressure resulting in disengagement of the other clutches of the transmission.

Therefore, it is desirable to provide a system wherein the lock-up clutch is operated from the same pressure source as that of the rest of the clutches and yet provides smooth and controllable operation.

SUMMARY AND OBJECTS OF THE INVENTION

It is the primary object of the present invention to overcome the above-mentioned problems of the prior art.

Another object of the present invention is to provide an improved control system for the lock-up clutch of a power shift transmission having a torque converter.

A further object of the present invention is to provide a power shift transmission having a torque converter and a lock-up clutch with means for limiting the oil flow to fill up the lock-up clutch to prevent excessive oil pressure drop within the transmission oil system.

In accordance with the primary aspect of the present invention, a power transmission comprising the combination of a torque converter and a speed shift gear box is provided with a lock-up clutch for locking the impeller and turbine of the torque converter wherein the lock-up clutch is operated by the same fluid that is operative to operate the clutches in the power shift transmission, but includes means for reducing the flow and the pressure of the oil directed to the lock-up clutch to prevent excessive pressure drop within the oil system.

BRIEF DESCRIPTION OF THE DRAWINGS

The above and other objects and advantages of the present invention will become apparent from the following description when taken in connection with the drawings, wherein FIG. 1 is a schematic layout of a control system in accordance with the present invention for a power shift transmission having a torque converter;

FIG. 2 is a sectional view of a flow-limiting and pressure-reducing valve in accordance with the present invention;

FIG. 3 is a sectional view of the valve like FIG. 2 with the valve shown in different operative position.

DETAILED DESCRIPTION OF THE PREFERRED EMBODIMENT

Referring now to FIG. 1 of the drawings, there is illustrated in schematic form a circuit generally designated by the numeral 10 for controlling a power shift transmission generally designated by the numeral 12. The power shift transmission includes a torque converter indicated generally at 14 operatively connected in a usual manner to a transmission 16 preferably of the multi-speed type, having a plurality of clutches and/or brakes establishing the different drive connections and gearing ratios. The term clutch as used herein is intended to cover brakes when used to establish drive through a transmission.

The torque converter includes an impeller 18 drivingly connected in a suitable manner to an output shaft 20 of an engine or prime mover of a vehicle. A stator 22 is suitably mounted in the torque converter housing by means of a one-way clutch 24. A turbine 26 receives torque from impeller 18 and transfers it by a suitable shaft, or the like, 28 to the input of the transmission 16.

A lock-up clutch 30 is selectively operable to lock the impeller 18 and turbine 26 together for rotation together. This provides a direct coupling between the input shaft 20 from the engine and the input shaft 28 to the transmission 16.

A lock-up clutch of this type is preferably used on machines which are equipped with retarders and also where a direct drive is provided when the transmission is in certain ranges to lock the turbine and impeller together. This arrangement allows maximum use of the engine's braking characteristics while retarding the motion of the vehicle.

The lock-up clutch 30 is provided to be controlled simultaneously with and dependent upon fluid pressure that is used in the system for engaging the transmission clutches and brakes.

Fluid for the torque converter and for the control system is provided from a suitable tank or reservoir 32 by means of a pump 34 which supplies pressurized fluid by way of a conduit 31 through a junction 29 where it divides and goes by way of a conduit 34 to a pressure control group 36. A branch conduit 48 communicates oil from junction 32 to shift cylinder control group 46. A conduit 50 communicates between a speed select group 44 and a conduit 52 downstream of the pressure control group 36. The conduit 52 is operative to supply pressurized fluid to a flow-restrictor and pressure-reducing valve 54. Oil for operation of the torque converter 12 is supplied to the inlet of the converter by means of a conduit 56 communicating between pressure control group 36 and the inlet of the converter 12.

Pressurized fluid for operating the clutches and/or brakes of the power shift transmission is supplied by pump 34 at a pressure of approximately 335 psi. This pressure is necessary to maintain the clutches positively engaged to transmit torque through the transmission in an efficient manner.

This same fluid at 335 psi is supplied by way of conduit 52 to the flow-restrictor and pressure-reducing valve 54. This flow-restrictor and pressure-restricting valve 54 is operative to control the operation of the lock-up clutch 30 and in the course of that control the valve 54 controls the rate of flow of fluid to that clutch as well as the pressure of that fluid.

The valve 54 is fluid-operated by means of a suitable source of fluid pressure, preferably air pressure, from a suitable source and control valve 58 communicated by means of conduit means 60 to shift the valve 54 to its operating position.

Turning now to FIGS. 2 and 3, there is illustrated the details of the valve 54. The basic purpose of this valve 54 is to reduce the oil pressure as supplied from the transmission oil system to the torque converter lock-up clutch 30. The valve 54 comprises a housing 62 having a central through bore 64 in which is reciprocably mounted a valve spool assembly operative to control communication of fluid between a fluid inlet port 66 and a lock-up clutch outlet port 68 and a return port 70, which latter port is communicated by suitable conduit means with tank 32. A pair of end covers 72 and 74 close the ends of bore 64 and define a chamber 76 at the leftward end thereof for actuating or shifting the valve assembly.

The fluid inlet 66 communicates with an annulus 78 which in turn communicates with the central bore 64. The outlet port 68 also communicates with an annulus 80, which likewise communicates with the bore 64. An annulus 82 communicates the bore 64 with the return port 70.

The valve spool assembly comprises an outer sleeve 84 which is reciprocally mounted in bore 64 and includes a central bore 86 in which is mounted an inner sleeve or spool 88 for reciprocal movement with respect thereto.

The outer sleeve 84 includes a land 90 and a groove 92 which cooperate to respectively block and provide communication between the annuluses 80 and 82 and thereby the ports 68 and 70. Thus, when the valve spools are in the position shown in FIG. 2, the annulus 92 provides communication between ports 68 and 70 and thus vents the lock-up clutch 30 to render it inoperative.

The outer sleeve 84 also includes means comprising passage 94 which provides communication between annulus 78 and the bore 86 of the sleeve 84. The bore 86 includes a groove or annulus 96 which is provided with a passage 98 communicating between the bore 86 and the outside diameter of the sleeve 84 and with the annulus 80.

The inner spool or sleeve 88 includes a pair of adjacent annular grooves 100 and 102 defining a land therebetween 104, the combination of which is operative to control communication of fluid between restricted passage 94 and passage or port 98. Thus when the spool 88 is in the position as shown in FIG. 3, communication is provided between the inlet port 66, annulus 78, restricted passage 94, passage 98, annulus 80 and lock-up clutch port 68 so that fluid communicated therethrough acts on lock-up clutch 30 to engage the clutch.

On the other hand, when the inner spool 88 is in the position as shown in FIG. 2, communication between the inlet 66 and the outlet 68 is blocked by means of land 104, which effectively blocks communication between passage 94 and passage 98.

The groove 100 on spool or sleeve 88 defines a shoulder 106 which is operative upon movement of spool 88 to the left to cover passage 94 and throttle the flow of fluid therethrough.

The spool 88 includes inlet fluid pressure-responsive means which is responsive to the inlet fluid by way of conduit 66, or more particularly the build-up of fluid pressure in conduit 68 when clutch 30 begins engaging to begin shifting the valve 88 to the left to throttle the flow of fluid through passage 94.

This fluid pressure-responsive means comprises a piston or slug 108 mounted in a bore 110 of spool 88 and defining a pressure chamber 112 to which pressurized fluid is communicated by way of a restricted passage or orifice 114 from the fluid in annulus 80 which is communicated by way of port 68 with lock-up clutch 30.

Suitable resilient means, such as a compression spring 116, is mounted between the sleeves 84 and 88 to bias them respectively against opposite ends of the bore 64, as best shown in FIG. 2.

The spring 116 is mounted in a bore 118 in spool 88 and biases against one end of that bore and against a plug 120 which is mounted in the end of sleeve 84 by suitable means such as a pin 122. The plug 120 also serves to close the end of sleeve 88 and define a piston cooperating with bore 64 and end plate 72 to define a pressure chamber 76.

Air pressure acting in chamber 76 shifts the valve spool assembly comprising sleeve 84 and spool 88 to the right as shown in FIG. 3. Spool 88, however, is biased to the right by virtue of spring 116, as shown in FIGS. 2 and 3, to its normal position.

The introduction of fluid pressure into pressure chamber 112 acts on spool 88 to shift it to the left with respect to sleeve 84 and thereby operating to restrict the flow of fluid to the passage 94.

The restriction means in the valve assembly 54 is operative to reduce the pressure of the system communicated thereto by way of conduit 52 and port 66 to a pressure of approximately 200 psi in outlet port 68 which communicates that fluid to the lock-up clutch 30. This restriction means, including the restriction 94, is also operative in conjunction with the spool 88 to reduce the flow of the fluid from the inlet port 66 to the outlet port 68 and thus to the lock-up clutch 30.

Thus, it will be seen that the valve as provided herein provides means in a power transmission system having a torque converter and a multi-speed shift transmission having a lock-up clutch for the torque converter with means for reducing the pressure communicated to the lock-up clutch and also to reduce the pressure drop in the normal fluid system as a result of actuation of that lock-up clutch.

While the present invention has been defined and illustrated with respect to a single preferred embodiment, it is to be understood that numerous changes and modifications and adaptations may be made therein without departing from the spirit and scope of the invention as defined by the appended claims.

I claim:

1. A power transmission comprising a torque converter, a first fluid-actuated clutch for locking the impeller to the turbine of the torque converter, at least a second fluid-operated clutch for connecting the output of said torque converter to a load, a source of pressurized fluid, first means for directing fluid from said source to said second clutch at a first pressure and rate, and second means comprising a flow-limiting pressure-reducing valve for directing fluid from said source to said first clutch at a reduced rate and pressure, wherein said flow-limiting pressure-reducing valve comprises a housing having a bore, an inlet, an outlet and return openings all communicating with said bore;

a spool assembly mounted in said bore for controlling communication between said openings;

said spool assembly including a sleeve, a spool mounted in said sleeve, and a spring disposed between the ends of said sleeve and said spool to bias same to opposite ends of said bore to block communication between said inlet and said outlet and to provide communication of said outlet with said return opening.

2. The power transmission of claim 1 wherein said flow-limiting and pressure-reducing valve includes pressure-responsive means responsive to a second source of fluid pressure to shift said valve to a position to communicate fluid from said first source to operate said first clutch; and means responsive to fluid pressure build-up in said clutch to throttle the flow of fluid from said source to said clutch.

3. The power transmission of claim 2 wherein said means responsive to fluid pressure build-up comprises a cylindrical bore formed in one end of said spool;

a piston mounted in said bore and defining a chamber in one end of said bore; and a restricted passage communicating fluid pressure from said outlet to said chamber.

* * * * *

UNITED STATES PATENT AND TRADEMARK OFFICE
CERTIFICATE OF CORRECTION

PATENT NO. : 3,949,847
DATED : April 13, 1976
INVENTOR(S) : Richard F. Hoehn

It is certified that error appears in the above-identified patent and that said Letters Patent are hereby corrected as shown below:

In the drawing Sheet 1 of 2, Fig. 1, the spool 84 in valve 54 should have the right end cut off to provide clearance to shift between the end walls 72 and 74 of the housing 62, and should appear as follows:

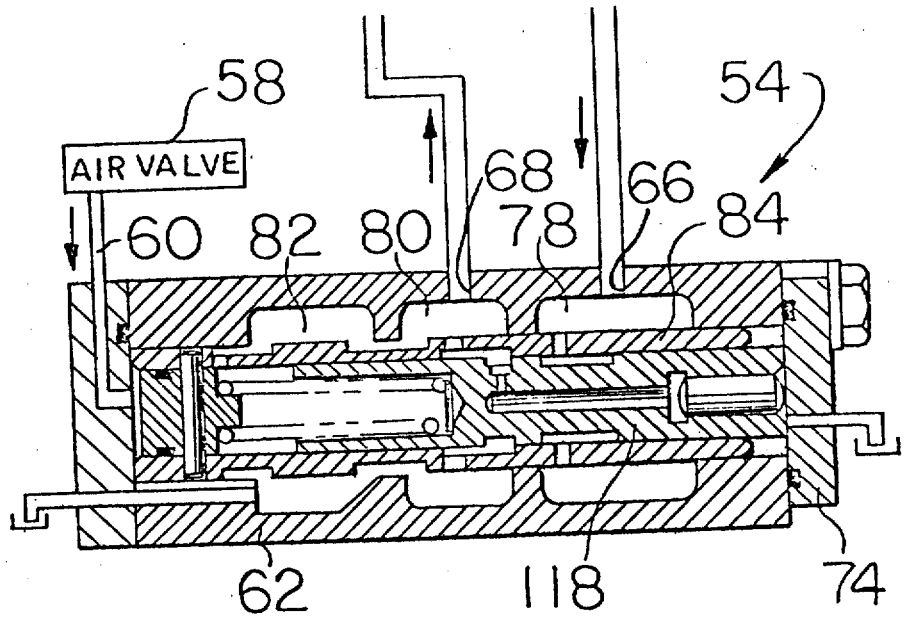

Signed and Sealed this

Thirtieth Day of November 1976

[SEAL]

Attest:

RUTH C. MASON
Attesting Officer

C. MARSHALL DANN
Commissioner of Patents and Trademarks